US007017030B2

(12) United States Patent
Oldfield et al.

(10) Patent No.: US 7,017,030 B2
(45) Date of Patent: Mar. 21, 2006

(54) PREDICTION OF INSTRUCTIONS IN A DATA PROCESSING APPARATUS

(75) Inventors: William Henry Oldfield, Rampton (GB); David Vivian Jaggar, Christchurch (NZ)

(73) Assignee: ARM Limited, Cambridge (GB)

( * ) Notice: Subject to any disclaimer, the term of this patent is extended or adjusted under 35 U.S.C. 154(b) by 711 days.

(21) Appl. No.: 10/078,276

(22) Filed: Feb. 20, 2002

(65) Prior Publication Data

US 2003/0159019 A1 Aug. 21, 2003

(51) Int. Cl.
*G06F 9/445* (2006.01)

(52) U.S. Cl. ........................................................ 712/207

(58) Field of Classification Search ................. 712/207, 712/209, 239, 43

See application file for complete search history.

(56) References Cited

U.S. PATENT DOCUMENTS 5,608,886 A * 3/1997 Blomgren et al. .......... 712/239
5,638,525 A * 6/1997 Hammond et al. ......... 712/209
5,781,750 A * 7/1998 Blomgren et al. .......... 712/209
5,794,068 A * 8/1998 Asghar et al. ................ 712/35
5,930,490 A * 7/1999 Bartkowiak ................. 712/203
6,021,489 A * 2/2000 Poplingher .................. 712/239
6,088,793 A * 7/2000 Liu et al. .................... 712/239
6,253,316 B1 * 6/2001 Tran et al. .................. 712/239
6,356,997 B1 * 3/2002 Krishnan et al. ........... 712/237
6,430,674 B1 * 8/2002 Trivedi et al. ................ 712/43

FOREIGN PATENT DOCUMENTS

EP 0 833 246 4/1998
WO WO 00/45257 8/2000

* cited by examiner

*Primary Examiner*—Eric Coleman
(74) *Attorney, Agent, or Firm*—Nixon & Vanderhye P.C.

(57) ABSTRACT

The present invention provides a data processing apparatus and method for predicting instructions in a data processing apparatus. The data processing apparatus comprises a processor core for executing instructions from any of a plurality of instruction sets, and a prefetch unit for prefetching instructions from a memory prior to sending those instructions to the processor core for execution. Further, prediction logic is used to predict which instructions should be prefetched by the prefetch unit, the prediction logic being arranged to review a prefetched instruction to predict whether execution of that prefetched instruction will cause a change in instruction flow, and if so to indicate to the prefetch unit an address within the memory from which a next instruction should be retrieved. Furthermore, in accordance with the present invention, the prediction logic is arranged to predict whether the prefetched instruction will additionally cause a change in instruction set, and if so to cause an instruction set identification signal to be generated for sending to the processor core to indicate the instruction set to which the next instruction belongs. This provides a particularly efficient technique for enabling the processor core to switch between different instruction sets.

14 Claims, 3 Drawing Sheets

PREDICTION OF INSTRUCTIONS IN A DATA PROCESSING APPARATUS

BACKGROUND OF THE INVENTION

1. Field of the Invention

The present invention relates to techniques for predicting instructions in a data processing apparatus, and in particular concerns such prediction in a data processing apparatus that supports multiple instruction sets.

2. Description of the Prior Art

A data processing apparatus will typically include a processor core for executing instructions. Typically, a prefetch unit will be provided for prefetching instructions from memory that are required by the processor core, with the aim of ensuring that the processor core has a steady stream of instructions to execute, thereby aiming to maximise the performance of the processor core.

To assist the prefetch unit in its task of retrieving instructions for the processor core, prediction logic is often provided for predicting which instruction should be prefetched by the prefetch unit. The prediction logic is useful since instruction sequences are often not stored in memory one after another, since software execution often involves changes in instruction flow that cause the processor core to move between different sections of code depending on the task being executed.

An example of a change in instruction flow that can occur when executing software is a "branch", which results in the instruction flow jumping to a particular section of code as specified by the branch. Accordingly, the prediction logic can take the form of a branch prediction unit which is provided to predict whether a branch will be taken. If the branch prediction unit predicts that a branch will be taken, then it instructs the prefetch unit to retrieve the instruction that is specified by the branch, and clearly if the branch prediction is accurate, this will serve to increase the performance of the processor core since it will not need to stop its execution flow whilst that instruction is retrieved from memory. Typically, a record will be kept of the address of the instruction that would be required if the prediction made by the branch prediction logic was wrong, such that if the processor core subsequently determines that the prediction was wrong, the prefetch unit can then retrieve the required instruction.

When a data processor apparatus supports execution of more than one instruction set, this can often increase the complexity of the work to be performed by the prefetch unit and/or prediction logic. For example, U.S. Pat. No. 6,088,793 describes a microprocessor which is capable of executing both RISC type instructions and CISC type instructions. The RISC type instructions are executed directly by a RISC execution engine, and the CISC type instructions are first translated by a CISC front end into RISC type instructions for execution by the RISC execution engine. To facilitate higher speed operation when executing either RISC type instructions or CISC type instructions, both the CISC front end and the RISC execution engine include branch prediction units, which operate independent of one another. Further, CISC type instructions are converted into RISC type instructions in such a manner that mispredicted branches are easily identified by the branch behaviour of the resulting converted RISC type instructions.

Whilst U.S. Pat. No. 6,088,793 teaches the use of separate branch prediction units to maintain efficient prediction and hence increase microprocessor performance when supporting more than one instruction set, such an approach may not always be the most appropriate. For example, in U.S. Pat. No. 6,021,489, a technique is described for sharing a branch prediction unit in a microprocessor implementing a two instruction set architecture. This patent describes the use of a microprocessor that integrates both a 64 bit instruction architecture (Intel Architecture 64, or IA-64) and a 32 bit instruction architecture (Intel Architecture 32, or IA-32) on a single chip. However, with the aim of reducing the area of the chip, a shared branch prediction unit is provided which is coupled to separate instruction fetch units provided for each architecture.

Whilst the above patents illustrate that it is possible to predict changes in instruction flow, for example branch predictions, in a data processing apparatus that supports multiple instruction sets, the problem that still exists is how to efficiently switch between the multiple instruction sets. Accordingly, it is an object of the present invention to provide a technique which provides for efficient switching between instruction sets within a data processing apparatus that has a processor core for executing instructions from multiple instruction sets.

SUMMARY OF THE INVENTION

Viewed from a first aspect, the present invention provides a data processing apparatus, comprising: a processor core for executing instructions from any of a plurality of instruction sets; a prefetch unit for prefetching instructions from a memory prior to sending those instructions to the processor core for execution; prediction logic for predicting which instructions should be prefetched by the prefetch unit, the prediction logic being arranged to review a prefetched instruction to predict whether execution of that prefetched instruction will cause a change in instruction flow, and if so to indicate to the prefetch unit an address within said memory from which a next instruction should be retrieved; the prediction logic further being arranged to predict whether the prefetched instruction will additionally cause a change in instruction set, and if so to cause an instruction set identification signal to be generated for sending to the processor core to indicate the instruction set to which said next instruction belongs.

The data processing apparatus of the present invention has a processor core for executing instructions from multiple instruction sets, a prefetch unit for prefetching instructions to be sent to the processor core, and prediction logic for predicting whether execution of a prefetched instruction will cause a change in instruction flow. Further, in accordance with the present invention, the prediction logic is further arranged to predict whether the prefetched instruction will additionally cause a change in instruction set, and if so to cause an instruction set identification signal to be generated for sending to the processor core to indicate the instruction set to which the next instruction belongs. This instruction set identification signal generated by the prediction logic enables the processor core to efficiently switch between instruction sets.

Hence, in accordance with the present invention, the prediction logic is not only being used to predict changes in instruction flow, but additionally is being used to predict changes in instruction set, thereby further improving the efficiency of the data processing apparatus.

In preferred embodiments, the prediction logic is arranged to detect the presence of an instruction of a first type which when executed will cause a change in instruction set if execution also results in said change in instruction flow. With instructions of the first type, if the prediction logic predicts that execution will result in a change in instruction flow, a change in instruction set will automatically occur, and accordingly in such situations the prediction logic is arranged to set the instruction set identification signal to indicate to the processor core the instruction set to be used for the next instruction (i.e. the instruction specified by the prediction logic to the prefetch unit as a result of analysing the instruction of the first type).

It will be appreciated that the instructions of the first type may be arranged to conditionally or unconditionally cause the change in instruction flow. However, in one embodiment of the present invention, execution of said instruction of the first type will unconditionally cause said change in instruction flow, and the address within said memory from which said next instruction should be retrieved is specified within the instruction. Accordingly, in such embodiments, the prediction logic is arranged to identify an instruction of the first type, and will then automatically predict the change in instruction flow and the change in instruction set as a result of identification of such an instruction. Again, the instruction set identification signal will be set accordingly so as to indicate to the processor core the instruction set to which the next instruction belongs.

In some embodiments, it has been found that the prediction logic can significantly improve the efficiency of switching between instruction sets when it is arranged solely to detect the presence of instructions of the first type (with or without detection of other instructions which might cause changes in instruction flow, but which would not cause changes in instruction set). However, in other embodiments of the present invention, the prediction logic may be arranged to detect the presence of an instruction of a second type which when executed can cause said change in instruction flow, and where data identifying the instruction set following said change in instruction flow is specified by the instruction. With instructions of the second type, a change in instruction set will not automatically take place if there is a change in instruction flow, but instead the instruction set applicable following the change in instruction flow is specified by the instruction itself. It will be appreciated that the prediction logic may be arranged to detect instructions of the second type in addition to, or instead of, instructions of the first type.

Since with instructions of the second type, a change in instruction set will not automatically result from the change in instruction flow, it will be appreciated that the prediction logic will need to perform further checks before it can predict whether the instruction of the second type will additionally cause a change in instruction set, and hence before the prediction logic can set the instruction set identification signal appropriately.

In preferred embodiments, the instruction of the second type specifies a register which contains said data identifying the instruction set following said change in instruction flow. Accordingly, if the prediction logic predicts that the instruction of the second type will cause a change in instruction flow, it will access the register in order to determine the instruction set following the change in instruction flow, and will then set the instruction set identification signal accordingly.

Further, in preferred embodiments, said register also contains an indication of the address within said memory from which a next instruction should be retrieved assuming the change in instruction flow takes place. Accordingly, if the prediction logic predicts that execution of the instruction of the second type will cause a change in instruction flow, it will retrieve from the register the address information, and provide that address information to the prefetch unit to enable the prefetch unit to retrieve as the next instruction the instruction specified by that address.

As with instructions of the first type, it will be appreciated that the instructions of the second type may be arranged to conditionally or unconditionally cause the change in instruction flow. However, in preferred embodiments, the instructions of the second type are such that the change in instruction flow occurs only if predetermined conditions are determined to exist at the time that the instruction of said second type is executed. In preferred embodiments, those predetermined conditions are specified within the instruction, and accordingly the prediction logic is arranged to predict whether those predetermined conditions will exist at the time that the instruction is executed by the processor core.

As mentioned earlier, changes in instruction flow can occur for a variety of reasons. However, one common reason for a change in instruction flow is the occurrence of a branch, and hence in preferred embodiments the prediction logic is a branch prediction logic, and the change in instruction flow results from execution of a branch instruction.

One way of operating the data processing apparatus involves each instruction prefetched by the prefetch unit being passed to the processor core for execution. However, with the aim of further increasing the performance of the processor core, some embodiments of the present invention can be arranged to selectively not forward instructions onto the processor core. More particularly, in certain embodiments, if the prediction logic predicts that execution of said prefetched instruction will cause said change in instruction flow, said prefetched instruction is not passed by the prefetch unit to the processor core for execution. Hence, if the main aim of the prefetched instruction is to cause a change in instruction flow, and the prediction logic has predicted that that change in instruction flow will result from execution of the prefetched instruction, a decision can be made not to forward that prefetched instruction onto the processor core for execution, such an approach being known as "folding" the instruction. When such folding occurs, then in preferred embodiments of the present invention, the prediction logic will pass on the appropriate address to the prefetch unit, to ensure that the prefetch unit retrieves as the next instruction the instruction required as a result of the change of instruction flow, and in addition the prediction logic will set the instruction set identification signal appropriately to ensure that the processor core is aware of the instruction set to which that next instruction belongs.

If the change in instruction flow specified by the prefetched instruction is unconditional, then it is clear that the above steps are typically all that is required. However, if the change in instruction flow is conditional, for example being dependent on predetermined conditions existing at the time that the prefetched instruction is executed, then in preferred embodiments a condition signal is sent to the processor core for reference by the processor core when executing said next instruction, the processor core being arranged, if said predetermined conditions are determined by the processor core not to exist, to stop execution of said next instruction, and to issue a mispredict signal to the prefetch unit. By this approach, the processor core can determine whether the predetermined conditions exist prior to it executing the next instruction as retrieved by the prefetch unit, and if those conditions are determined not to exist, it can issue a mispredict signal to the prefetch unit to enable the prefetch unit to then retrieve the appropriate instruction to enable the processor core to continue execution.

As mentioned earlier, in preferred embodiments, the prediction logic is a branch prediction logic and the prefetched instruction is a branch instruction. If the branch instruction is of a type which specifies a sub-routine which when completed will cause the instruction flow to return to the instruction sequentially following the branch instruction, then in preferred embodiments the prediction logic is arranged to output a write signal to the processor core to cause the processor core to store an address identifier which can subsequently be used to retrieve said instruction sequentially following the branch instruction. This ensures correct operation of the data processing apparatus following completion of the sub-routine specified by the branch instruction.

It will be appreciated by those skilled in the art that the prediction logic may be provided as a separate unit to the prefetch unit. However, in preferred embodiments, the prediction logic is contained within the prefetch unit, which leads to a particularly efficient implementation.

Viewed from a second aspect, the present invention provides prediction logic for a prefetch unit of a data processing apparatus, the data processing apparatus having a processor core for executing instructions from any of a plurality of instruction sets, and said prefetch unit being arranged to prefetch instructions from a memory prior to sending those instructions to the processor core for execution, said prediction logic being arranged to predict which instructions should be prefetched by the prefetch unit, and comprising: review logic for reviewing a prefetched instruction to predict whether execution of that prefetched instruction will cause a change in instruction flow, and if so to indicate to the prefetch unit an address within said memory from which a next instruction should be retrieved; and instruction set review logic for predicting whether the prefetched instruction will additionally cause a change in instruction set, and if so to cause an instruction set identification signal to be generated for sending to the processor core to indicate the instruction set to which said next instruction belongs.

Viewed from a third aspect, the present invention provides a method of predicting which instructions should be prefetched by a prefetch unit of a data processing apparatus, the data processing apparatus having a processor core for executing instructions from any of a plurality of instruction sets, and said prefetch unit being arranged to prefetch instructions from a memory prior to sending those instructions to the processor core for execution, the method comprising the steps of: (a) reviewing a prefetched instruction to predict whether execution of that prefetched instruction will cause a change in instruction flow, and if so indicating to the prefetch unit an address within said memory from which a next instruction should be retrieved; and (b) predicting whether the prefetched instruction will additionally cause a change in instruction set, and if so causing an instruction set identification signal to be generated for sending to the processor core to indicate the instruction set to which said next instruction belongs.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
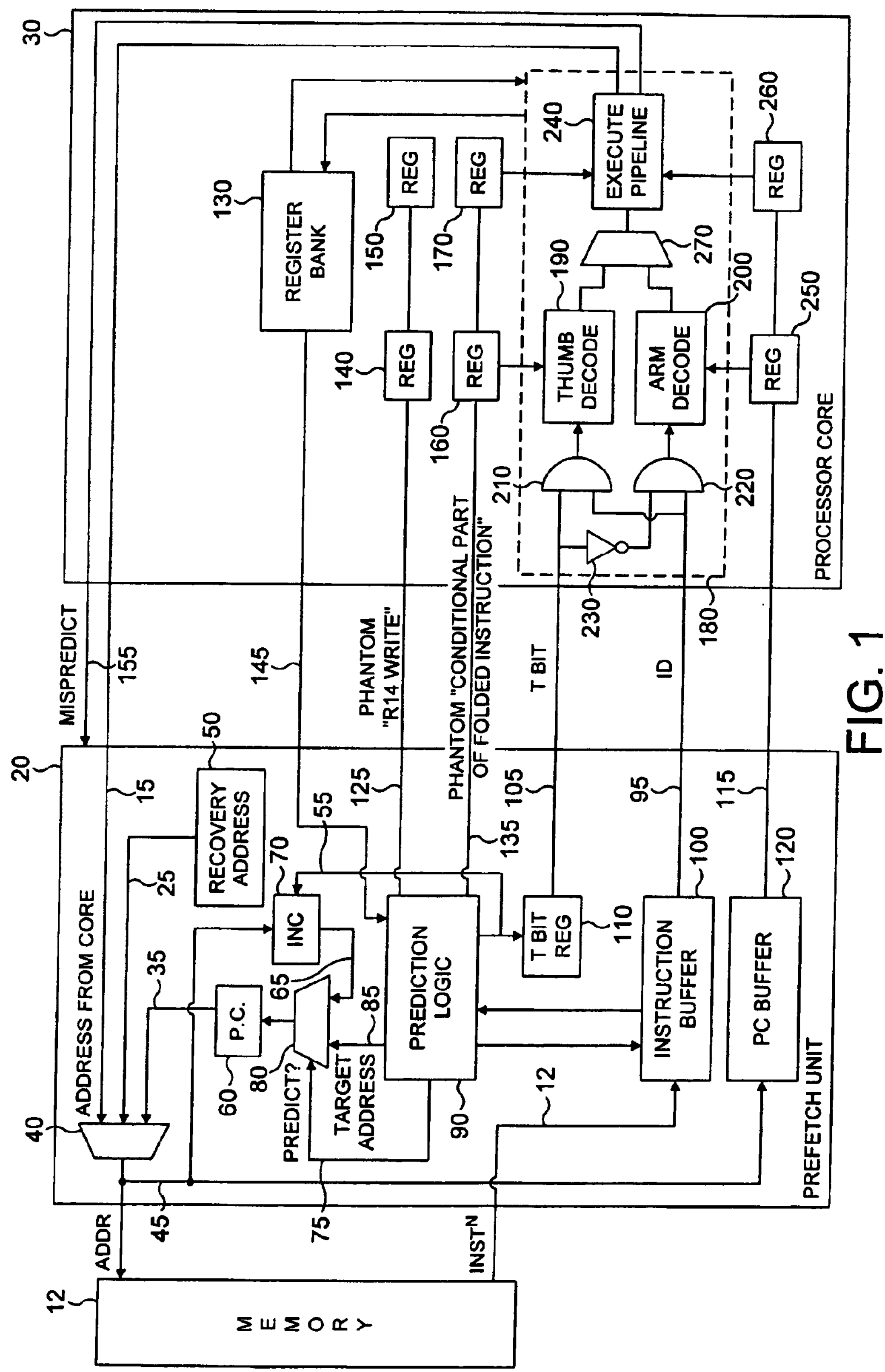
FIG. 1 is a block diagram of a data processing apparatus in accordance with an embodiment of the present invention.

FIG. 1 is a block diagram of a data processing apparatus in accordance with an embodiment of the present invention. In accordance with this embodiment, the processor core 30 of the data processing apparatus is able to process instructions from two instruction sets. The first instruction set will be referred to hereafter as the ARM instruction set, whilst the second instruction set will be referred to hereafter as the Thumb instruction set. Typically, ARM instructions are 32-bits in length, whilst Thumb instructions are 16-bits in length. In accordance with preferred embodiments of the present invention, the processor core 30 is provided with a separate ARM decoder 200 and a separate Thumb decoder 190, which are both then coupled to a single execution pipeline 240 via a multiplexer 270.

When the data processing apparatus is initialised, for example following a reset, an address will typically be output by the execution pipeline 240 over path 15, where it will be input to a multiplexer 40 of a prefetch unit 20. As will be discussed in more detail later, multiplexer 40 is also arranged to receive inputs over paths 25 and 35 from a recovery address register 50 and a program counter register 60, respectively. However, the multiplexer 40 is arranged whenever an address is provided by the processor core 30 over path 15 to output that address to the memory 10 in preference to the inputs received over paths 25 or 35. This will result in the memory 10 retrieving the instruction specified by the address provided by the processor core, and then outputting that instruction to the instruction buffer 100 over path 12.

Within the prefetch unit 20, prediction logic 90 is provided to assist the prefetch unit 20 in deciding what subsequent instructions to retrieve for the processor core 30. In preferred embodiments, the prediction logic 90 is a branch prediction logic which is arranged to determine the presence of branch instructions received by the instruction buffer 100 over path 12 from the memory 10, and to predict whether the branches specified by those branch instructions will or will not be taken by the processor core.

In preferred embodiments, the prediction logic knows whether any particular instruction in the instruction buffer 100 is an ARM or a Thumb instruction, since as will be discussed in more detail later, this information is provided in a corresponding entry of the T-bit register 110, the T-bit register preferably having an entry for each instruction in the instruction buffer.

For each instruction received in the instruction buffer 100, the prediction logic 90 will perform some branch prediction schemes applicable to either an ARM or a Thumb instruction, dependent on which type of instruction the corresponding entry in the T-bit register identifies the instruction as. As will be appreciated by those skilled in the art, many branch prediction schemes exist, and accordingly will not be discussed in further detail herein.

As a result of the prediction performed by the prediction logic, the prediction logic will output a predict signal over path 75 to multiplexer 80, indicating whether the prediction logic has determined the presence of a branch instruction and is predicting that the branch will be taken. If the prediction logic has determined the presence of a branch instruction, and has predicted that the branch will be taken, then it will also issue over path 85 to the multiplexer 80 a target address for the next instruction, this target address typically being specified by the branch instruction, and being the destination address for the branch.

The multiplexer 80 will also receive at its other input the output of an incrementer 70 over path 65, the incrementer 70 in turn receiving at its input the address as output by the multiplexer 40 to the memory 10. The incrementer 70 is arranged to take the address provided to it over path 45, apply an increment value to that address, and output the incremented address over path 65 to the multiplexer 80. It should be noted that in preferred embodiments the incrementation applied by the incrementer 70 is dependent on whether the instruction specified by the received address is an ARM instruction or a Thumb instruction. For an ARM instruction, the address is incremented by four in preferred embodiments, whilst for a Thumb instruction the address is incremented by two. As will be discussed in more detail later, the prediction logic 90 of preferred embodiments is arranged to issue a signal indicating the instruction set applicable to the next instruction to be prefetched, and this signal is passed over path 55 to the incrementer 70 to enable the incrementer to apply the appropriate incrementation to the address received over path 45.

The multiplexer 80 is arranged such that if the predict signal received by the multiplexer 80 over path 75 indicates that the prediction logic has predicted that a branch will be taken, that multiplexer will output to the program counter register 60 the target address received over path 85 from the prediction logic 90. In all other situations, the multiplexer 80 will output to the program counter register 60 the incremented address as received over path 65.

Accordingly, it will be appreciated that the program counter register 60 then records the address of the next instruction that should be retrieved by the prefetch unit 20 from the memory 10, and accordingly multiplexer 40 is arranged to output that address to the memory 10, which results in that next instruction being returned to the instruction buffer 100 of the prefetch unit 20 over path 12.

Returning now to the prediction logic 90, in accordance with preferred embodiments of the present invention this logic is arranged not only to predict whether a branch instruction will be taken, but also to predict whether the instruction set will change as a result of that branch instruction. In preferred embodiments, the instruction set will only change as a result of execution of an instruction that causes a change in instruction flow, typically a branch instruction. Accordingly, if the prediction logic 90 predicts that a branch will be taken, it is further arranged to predict whether that branch will result in a change in instruction set, and to issue an instruction set identification signal indicative of that prediction. In preferred embodiments, this instruction set identification signal is referred to as a Thumb bit (or T bit) signal which is output to T bit register 110, and also passed over path 55 to the incrementer 70 as discussed earlier.

In preferred embodiments, the prediction logic is arranged to issue a T bit signal each time it performs a prediction on an instruction from the instruction buffer, the value of this T-bit signal being associated with the next instruction prefetched as a result of the prediction performed by the prediction logic 90. Hence, when the next instruction is prefetched, and enters the instruction buffer, the prediction logic will know from the corresponding T-bit in the T-bit register which instruction set that instruction belongs to. As mentioned above, the T-bit signal may only change in preferred embodiments as a result of an instruction that causes a change in instruction flow. Hence, considering the prediction logic 90 of preferred embodiments, which predicts whether branches will be taken, the T-bit signal will only be changed if the prediction logic predicts that a branch will be taken, and then only if it further predicts that the taking of that branch will result in a change in instruction set.

In preferred embodiments, the T bit signal will be set to a logic one value if the prediction logic 90 predicts that the next instruction is a Thumb instruction, and will be set to a logic zero value if the prediction logic 90 predicts that the next instruction will be an ARM instruction. Accordingly, as each instruction is output from the instruction buffer 100 to the processor core 30 over path 95, a corresponding T bit signal is output from the T bit register 110 over path 105 to the processor core 30. Both the instruction and the T bit signal are input into the decode and execute unit 180 of the processor core 30.

The instruction and the T bit signal are input to a first AND gate 210 whose output is then connected to the Thumb decoder 190. Accordingly, if the T bit signal is set to a logic one value to indicate that the instruction is a Thumb instruction, this will result in the instruction being output by the AND gate 210 to the Thumb decoder 190. The instruction and an inverted version of the T bit signal (as inverted by inverter 230) is also passed to a second AND gate 220, which provides at its output an input to the ARM decoder 200. Accordingly, if the T bit signal is set to a logic one value to indicate that the instruction is a Thumb instruction, this will result in the instruction not being passed on by the AND gate 220 to the ARM decoder 200. Conversely, it can be seen that if the T bit signal is set to a logic zero value to indicate that the instruction is an ARM instruction, this will result in the instruction being passed to the ARM decoder 200 via AND gate 220, and not being passed to the Thumb decoder 190 via AND gate 210. The use of the AND gates 210, 220 enable power savings to be achieved, since the unused decoder is not changing logic levels unnecessarily.

The outputs from both decoders 190, 200 are input to a multiplexer 270, which is arranged to pass on the appropriate decoded instruction to the execution pipeline 240. Preferably, the drive signal for the multiplexer is derived from the T bit signal, thereby enabling an automatic selection of the appropriate decoded instruction for routing to the execution pipeline 240. During execution of the instruction, the execution pipeline 240 may retrieve data from, and/or store data to, the register bank 130 within the processor core 30. In addition, it is possible that the instruction executed by the execute pipeline 240 may result in a "calculated branch" being required, in which event the execute pipeline 240 will issue the address for the next instruction required over path 15 to the prefetch unit 20, where that address will then be input to the multiplexer 40. It should be noted that such instructions that will result in a calculated branch are not branch instructions, and accordingly are not predicted by the prediction logic 90 of preferred embodiments. However, it will be appreciated that the prediction logic 90 could if desired be adapted to predict calculated branches, but this would increase the complexity of the prediction logic.

When such a calculated branch is determined by the execute pipeline 240, it is necessary for the processor core and prefetch unit to be flushed of all instructions already within the prefetch unit and processor core to ensure that the next instruction executed is the one specified by the address issued over path 15. The signals required to perform this flush will be issued by the execute pipeline 240 to the relevant components of the prefetch unit and the processor core, for example, the instruction buffer 100, the Thumb decoder 190, the ARM decoder 200, and the earlier stages of the execution pipeline 240. For clarity in the drawings, these various signal lines have not been included.

However, in the absence of an address signal on path 15 from the processor core 30, the prefetch unit 20 will continue to prefetch instructions dependent on the value of the program counter stored within the program counter register 60, and thus the instructions retrieved into the instruction buffer 100 will be in a sequence which takes account of any branch predictions predicted by the prediction logic 90.

For the system to work efficiently, it is expected that the prediction logic 90 will correctly predict branches most of the time. However, occasionally the processor core 30 may determine when executing the instruction sequence output from the instruction buffer 100 that a prediction made by the prediction logic 90 was in fact incorrect, and in such instances steps need to be taken to correct this error.

In preferred embodiments, if the execute pipeline 240 determines that a prediction made by the prediction logic 90 was incorrect, it will issue a mispredict signal over path 155 to the prefetch unit 20 to cause the prefetch unit to flush any instructions already within the instruction buffer, and to retrieve as its next instruction the instruction specified by the address in the recovery address register 50. The execute pipeline 240 will also issue appropriate signals internally within the processor core 30 to flush any instructions that are already in the Thumb or ARM decoders 190, 200, and earlier pipeline stages of the execute pipeline 240.

The address that is stored within the recovery address register 50 is determined as follows. The register 50 is arranged to receive the output from a multiplexer (not shown in FIG. 1) that, like multiplexer 80, is arranged to receive the target address output by the prediction logic 90 over path 85 and the incremented address output by the incrementer 70 over path 65. However, the multiplexer associated with the recovery address register 50 is arranged to receive an inverse of the predict signal output over path 75 from the prediction logic. Hence, it can be seen that if the prediction logic 90 predicts a branch, then the value output by the incrementer 70 is stored in the recovery address register 50, whilst if the prediction logic predicts that a branch will not be taken, the target address of the branch is stored in the recovery address register 50. Hence, in the event that the prediction was incorrect, the recovery address register 50 will store the correct address for the next instruction required by the processor core 30, and accordingly the multiplexer 40 will be arranged in the event of the mispredict signal 155 to output that recovery address to the memory 10, to cause the appropriate instruction to be retrieved into the instruction buffer 100 for passing into the decode and execute unit 180 of the processor core 30.

Each address output by the multiplexer 40 to the memory 10 is also routed to the program counter buffer 120 within the prefetch unit. As each instruction is output by the instruction buffer 100 over path 95 to the processor core 30, the corresponding program counter value is output from the program counter buffer 120 over path 115 to the processor core 30. This value is then passed through a sequence of registers 250, 260 within the processor core, so that the relevant program counter value is available to the decoders 190, 200 and the execution pipeline 240 as and when required.

In one embodiment of the present invention, all instructions retrieved into the instruction buffer 100 are passed to the processor core 30 for execution. However, in certain embodiments, with the aim of increasing performance of the processor core, branch instructions are removed from the instruction buffer 100 once detected by the prediction logic 90.

Branch instructions may broadly speaking fall into two categories, namely unconditional branch instructions and conditional branch instructions. For unconditional branch instructions, provided the prediction logic 90 can accurately determine the presence of such unconditional branch instructions, there should be no requirement for the processor core to actually execute that branch instruction, since the branch will occur. Accordingly, in preferred embodiments, such unconditional branch instructions are removed from the instruction sequence in the instruction buffer 100, such a process being referred to as "folding".

Further, in one embodiment of the present invention, conditional branch instructions can also be folded, but in this instance the prediction logic 90 is arranged to output to the processor core 30 the relevant conditional information pertaining to that branch. This conditional information forming part of the folded instruction is output as a phantom signal to a register 160 of the processor core 30 over path 135 at the same time that the next instruction specified by the target address of the branch instruction is output to the processor core 30 over path 95, along with the relevant T bit signal identifying the instruction set pertaining to that instruction as calculated by the prediction logic 90. This conditional information is passed through a sequence of registers 160, 170 for reference by the various elements of the decode and execute unit 180 as and when required. In particular, when the instruction resulting from the branch reaches the execute pipeline 240, the execute pipeline 240 is arranged to review that conditional information to determine whether the conditions specified by that conditional information do in fact exist. If those conditions do exist, then the execute pipeline proceeds with execution of that next instruction, whereas if the conditions do not exist, the execute pipeline 240 will issue a mispredict signal over path 155, which results in the processing described earlier.

Certain branch instructions can specify a sub-routine which when completed will cause the instruction flow to return to the instruction sequentially following the branch instruction. For such branch instructions, if they are to be folded, it is clearly important to keep a record of the address of the instruction that should be returned to following completion of the sub-routine. In preferred embodiments, this address is stored in register R14 of the register bank 130, and accordingly if such a branch instruction is folded, the prediction logic 90 is arranged to issue a phantom "R14 write" signal over path 125 to a register 140 within the processor core 30. This address value is passed through a sequence of registers 140, 150, and assuming the branch is determined to have been correctly predicted, will result in the register R14 being updated with the relevant address by the decode and execute unit 180.

An important aspect of preferred embodiments of the present invention is that the prediction logic 90 not only predicts the likelihood that a branch instruction will be taken, but also predicts whether the taking of that branch will result in a change in instruction set, with the T bit signal then being set to indicate the predicted instruction set. By passing this T bit signal to the processor core 30 along with the relevant instruction from the instruction buffer 100, an automatic selection can be made of the appropriate decoded instruction for routing to the execution pipeline 240, significantly increasing the efficiency of the processor core by automatically invoking the instruction set change within the decode and execute unit 180. More details of the process performed by the prediction logic 90 will now be described in more detail with reference to FIG. 2.

At step 300, the prediction logic waits for a new instruction to be received into the instruction buffer 100, and then proceeds to step 310, where it is determined whether prediction is turned on or off. Assuming prediction is required, the process then proceeds to step 330, where it is determined whether prefetch abort is set. As will be appreciated by those skilled in the art, prefetch abort is used by systems that have an Memory Management Unit (MMU) and use virtual memory that can be mapped in or out. If the processor core branches to an area of memory that is mapped out then it receives a prefetch abort from the MMU. The abort routine then maps the correct area of memory in and returns to the same instruction. In such embodiments, it is important not to do branch predictions on the (potentially) random data returned from the memory if the MMU indicates a prefetch abort, since the data may look like a branch. Hence, if either the prediction is turned off, or the prefetch abort is set, the process branches to step 320, where no prediction is performed.

However, assuming that the prefetch abort is determined not to be set, then the process proceeds to step 340 where it is determined whether the received instruction is an ARM instruction. This is readily determinable by reference to the corresponding T-bit stored in T-bit register 110.

If it is determined at step 340 that the instruction is an ARM instruction, then the process proceeds to step 350, where it is determined whether that instruction is a branch instruction. Examples of branch instructions looked for by the prediction logic 90 will be discussed in more detail later with reference to FIGS. 3A to 3F. However, in general terms, the detection of a branch instruction is determined by comparing the values of predetermined bits of the instruction with the values of those bits for known branch instructions. If at step 350 a branch instruction is not detected, then the process proceeds to step 360 where any other specified predictions can be performed. In preferred embodiments, the prediction logic 90 is solely a branch prediction logic unit, and will not perform any other specified predictions. However, it will be appreciated by those skilled in the art that the prediction logic 90 could be extended to perform other predictions as well as branch predictions, such other predictions occurring at step 360.

Assuming a branch is detected at step 350, it is then determined at step 370 whether the branch is unconditional. In preferred embodiments, certain types of branch instruction are by definition unconditional, whilst others may have condition bits set to specify one or more conditions that are required to exist at the time the branch instruction is executed if the branch is to be taken. For any unconditional branch instructions, or conditional branch instructions that do not have any condition bits set, the process proceeds from step 370 to step 400, where the prediction logic 90 predicts that the branch will be taken.

From step 400, the process then proceeds to step 430, where it is determined whether the instruction set will change as a result of the branch. As will be discussed later with reference to FIGS. 3A to 3F, in preferred embodiments some types of branch instruction are such that the instruction set will always change if the branch is taken, and accordingly in such situations the process will flow automatically from step 430 to step 440, resulting in the T bit being changed to reflect the new instruction set. As mentioned earlier, in preferred embodiments the T bit is set to one to denote a Thumb instruction, and to zero to denote an ARM instruction. Other branch instructions are of a type where data identifying the instruction set that will be applicable following the branch is specified within the instruction. More particularly, in preferred embodiments, such branch instructions will specify a register which contains information identifying the instruction set applicable if the branch is taken. If that information indicates the instruction set will be changed, then the process proceeds from step 430 to step 440 to cause the T bit signal to be changed (and a corresponding T-bit signal to be issued by the prediction logic 90 to the T-bit register 110). Otherwise the process proceeds from step 430 to step 420 where no change of the T bit is made. In preferred embodiments, although the value of the T-bit is unchanged, a T-bit signal is still issued by the prediction logic 90 to the T-bit register 110 so that a separate T-bit value is stored within the T-bit register for each instruction in the instruction buffer.

Returning to step 370, if the branch instruction is not unconditional, the process proceeds to step 380, where a predetermined prediction scheme is applied to determine whether to predict the branch as taken. As will be appreciated, there are many known prediction schemes which could be used, and hence they will not be discussed in detail herein. However, an example of a simple branch prediction scheme that may be used in embodiments of the present invention is: backwards conditional branches (i.e. branches that point to an instruction with a lower address) are predicted as taken, forward conditional branches (i.e. branches that point to an instruction with a higher address) are predicted as not taken. This generally works as there are many loops with the branch back to the beginning of the loop at the bottom of the loop.

The process then proceeds to step 390, where it is determined whether the prediction indicates that the branch will be taken. If it is predicted at that step that the branch will not be taken, then the process proceeds to step 410 where the prediction logic 90 issues as the predict signal over path 75 a signal indicating that the branch is predicted as not taken. Then the process proceeds to step 420, where no change of the T bit is made, since in preferred embodiments the instruction set will only change following a branch.

If at step 390 it is determined that the branch will be taken, the process proceeds to stop 400, where the earlier described steps are performed.

Figure 2:
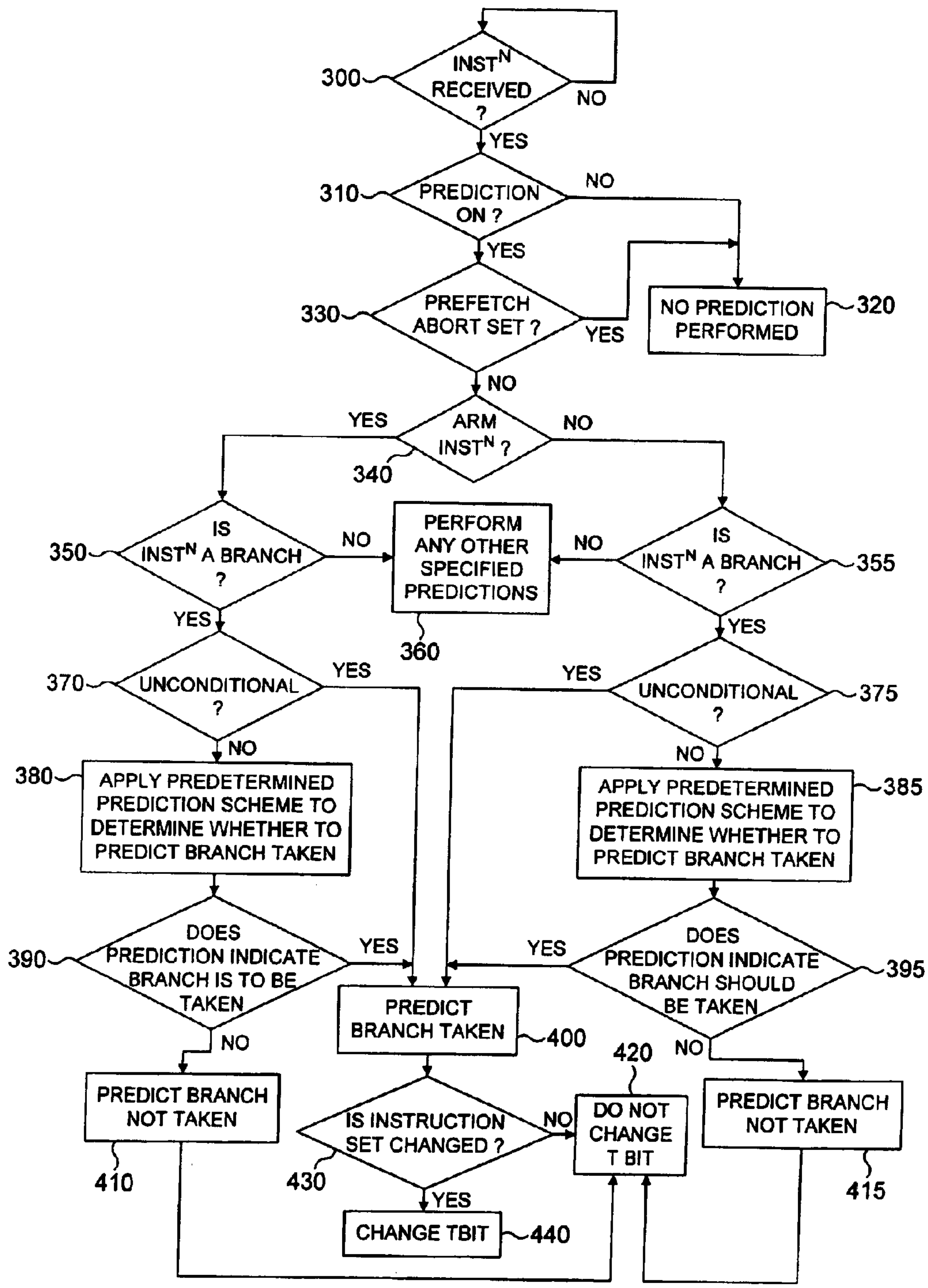
FIG. 2 is a flow diagram of the process performed by the prediction logic of FIG. 1.

As will be appreciated from FIG. 2, an analogous sequence of steps is also performed by the prediction logic 90 if at step 340 it is determined that the instruction is not an ARM instruction, and is accordingly a Thumb instruction. The steps 355, 375, 385, 395 and 415 perform the equivalent functions for Thumb instructions as steps 350, 370, 380, 390 and 410, respectively, perform in relation to ARM instructions. They are drawn separately in FIG. 2 since the actual processing performed will differ. For example, ARM branch instructions have a different format to Thumb branch instructions, and accordingly the comparisons required at step 355 to determine whether a Thumb instruction is a branch instruction will differ to the comparisons that need to be performed at step 350 for ARM instructions. Similarly, the prediction schemes used at step 385 for Thumb branch instructions may differ to the prediction schemes employed at step 380 for ARM branch instructions.

As will be appreciated by those skilled in the art, when the process completes any of steps 320, 360, 420 or 440, the process automatically returns to step 300, where the prediction logic 90 awaits receipt by the instruction buffer 100 of a new instruction.

Figure 3A:
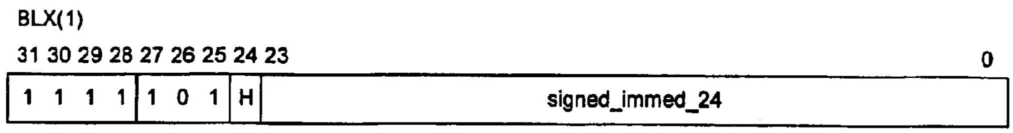
FIGS. 3A to 3F are diagrams illustrating the form of branch instructions used in embodiments of the present invention which can result in a change in instruction set.
Figure 3B:
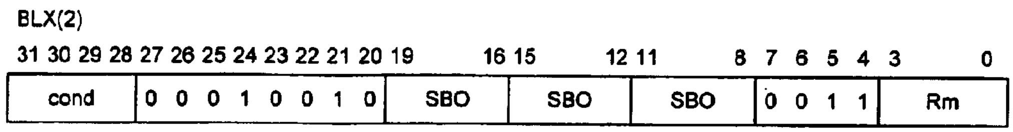
Figure 3C:
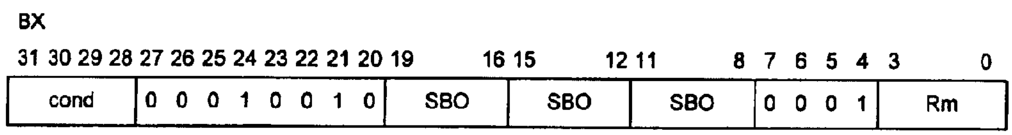
Figure 3D:
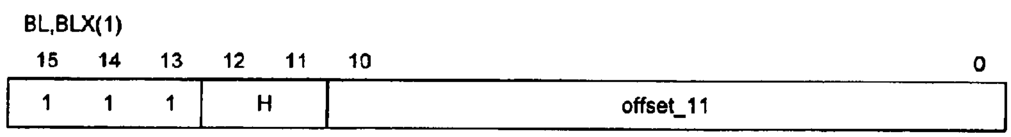
Figure 3E:
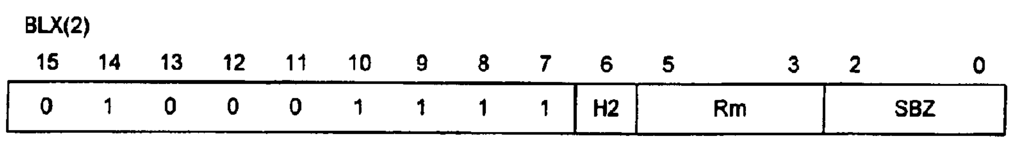
Figure 3F:
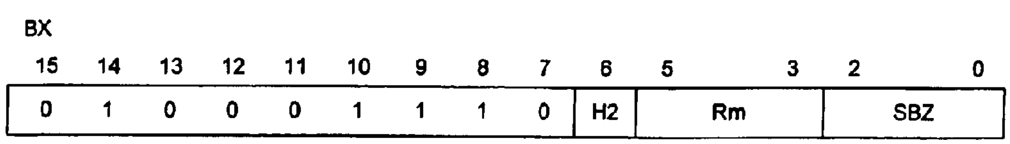

FIGS. 3A to 3F illustrate the format of certain branch instructions that the prediction logic 90 is arranged to detect and perform prediction on. FIGS. 3A to 3C illustrate three types of ARM branch instructions, whilst FIGS. 3D to 3F illustrate corresponding versions of Thumb branch instructions. As can be seen from the figures, the ARM branch instructions are 32-bit instructions, whilst the Thumb branch instructions are 16-bit instructions.

Looking at FIG. 3A, this illustrates a form of an ARM BLX (Branch with Link and Exchange) instruction (referred to as BLX(1)), which is used to call a Thumb subroutine from the ARM instruction set at an address specified within the instruction. This instruction is unconditional, and accordingly always causes a change in program flow, and preserves the address of the instruction following the branch in a link register (as discussed earlier with reference to FIG. 1, this link register is preferably register R14 of the register bank 130). Execution of the Thumb instructions begins at the target address, which is derived from the address specified in the BLX instruction as follows:

1. Sign-extending the 24-bit signed (two's complement) immediate to 32 bits
2. Shifting the result left two bits
3. Setting bit[1] of the result of step 2 to the H bit
4. Adding the result of step 3 to the contents of the PC, which identifies the address of the branch instruction.

The instruction can therefore in preferred embodiments specify a branch of approximately ±32 MB.

As was discussed earlier with reference to FIG. 1, this target address will be stored within the program counter register 60 as the new program counter. Additionally, since the branch instruction is unconditional, and will always result in a change in instruction set, the T bit signal is updated to a logic one value to indicate that the next instruction will be a Thumb instruction. Further, as mentioned earlier, register R14 will be updated to store the address of the instruction following the BLX instruction.

The prediction logic 90 detects the presence of the ARM BLX (1) instruction by looking at bits 25 to 31 of the instruction which will, as illustrated in FIG. 3A, have the value "1111101" in preferred embodiments if the instruction is indeed an ARM BLX (1) instruction.

FIG. 3B illustrates another form of ARM BLX instruction (referred to as BLX (2)) which is used to call an ARM or a Thumb sub-routine from the ARM instruction set, at an address specified in a register. In particular, the branch target address is the value stored in register Rm, with its bit [0] being forced to zero. Register Rm is identified by bits 0 to 3 of the BLX(2) instruction. Further, the instruction set to be used at the branch target address is specified by bit [0] of Rm. Accordingly, if bit [0] is one, this indicates that the instruction set at the branch target address will be Thumb, whereas if instead it has a value of zero, this indicates that the instruction set at the branch target address will be ARM. As with the ARM BLX (1) instruction, the address of the instruction following the branch is stored in the register R14 to enable the process to return to that instruction once the sub-routine has been completed.

The prediction logic 90 is arranged to review bits 4 to 7 and 20 to 27 of a candidate branch instruction to determine whether that instruction is indeed a BLX (2) instruction, in which event those bits will be as shown in FIG. 3B, i.e. "0011" and "00010010", respectively. Further, bits 28 to 31 specify conditions that are required to exist in order for the branch to be taken. As will be appreciated by those skilled in the art, there are many different conditions which can be set. Furthermore, these four bits can be set to an "always" condition code, which indicates that the branch is in fact unconditional. As illustrated in FIG. 3B, in preferred embodiments bits 8 to 19 should be one for a BLX (2) instruction.

FIG. 3C illustrates an ARM BX (Branch and Exchange) instruction which is used to branch to an address held in a register Rm, with an optional switch to Thumb execution. As with the BLX (2) instruction, the branch target address is the value of register Rm with its bit [0] forced to zero, and the instruction set to be used at the branch target address is specified by bit [0] of register Rm. Again, the prediction logic 90 will look at bits 4 to 7 and 20 to 27 of a candidate branch instruction, which will have the values "0001" and "00010010", respectively, if the instruction is indeed an ARM BX instruction. As with the ARM BLX (2) instruction, bits 0 to 3 identify register Rm, bits 28 to 31 specify condition codes, and bits 8 to 19 should be one.

FIG. 3D illustrates a Thumb BL (Branch with Link) or a form of the Thumb BLX (Branch with Link and Exchange) instruction. The BL instruction provides an unconditional sub-routine call to another Thumb routine. The return from the subroutine is typically performed by either making the contents of the register R14 the new program counter, or by branching to the address specified in register R14, or by executing an instruction to specifically load a new program counter value.

The BLX (1) form of the Thumb BLX instruction provides an unconditional subroutine call to an ARM routine. Again, the return from the sub-routine is typically performed by executing a branch instruction to branch to the address specified in register R14, or by executing a load instruction to load in a new program counter value.

To allow for a reasonably large offset to the target subroutine, each of these two instructions is automatically translated by the assembler into a sequence of two 16-bit Thumb instruction, as follows:

The first Thumb instruction has H=10 and supplies the high part of the branch offset. This instruction sets up for the subroutine call and is shared between the BL and BLX forms.

The second Thumb instruction has H=11 (for BL) or H=01 (for BLX). It supplies the low part of the branch offset and causes the subroutine call to take place.

The target address for the branch is in preferred embodiments calculated as follows:

1. Shifting the offset_11 field of the first instruction left twelve bits.
2. Sign-extending the result to 32 bits.
3. Adding this to the contents of the PC (which identifies the address of the first instruction).
4. Adding twice the offset_11 field of the second instruction. For BLX, the resulting address is forced to be word-aligned by clearing bit[1].

The instruction can therefore in preferred embodiments specify a branch of approximately ±4 MB.

Accordingly, if the prediction logic 90 reviews bits 11 to 15 of a candidate Thumb branch instruction, and determines that bits 13 to 15 are "111" whilst bits 11 and 12 are "10" then the prediction logic 90 will conclude that this is the first of two instructions specifying the branch. If when reviewing the next instruction, it is determined that bits 13 to 15 are "111" and bits 11 and 12 are "11" then the prediction logic 90 will determine that a Thumb BL instruction is present, whereas if it is determined that bits 13 to 15 are "111" and bits 11 and 12 of the next instruction are "01", the prediction logic 90 will determine that a Thumb BLX (1) instruction is present. In the latter case, in addition to calculating the target address as indicated above, the prediction logic 90 will also set the T bit to zero to indicate that the next instruction will be an ARM instruction. In addition, the return address specifying the Thumb instruction to follow execution of the ARM routine will be stored in register R14.

FIG. 3E illustrates another form of the Thumb BLX instruction (referred to as BLX(2)) that is used to call an ARM or a Thumb sub-routine from the Thumb instruction set, at an address specified in a register. Unlike the ARM BLX (2) instruction, this branch instruction is unconditional. The prediction logic 90 will recognise the presence of the Thumb BLX (2) instruction by reviewing bits 7 to 15 of a candidate instruction, which will have the value "010001111" if that instruction is indeed a Thumb BLX (2) instruction. When such an instruction occurs, the prediction logic 90 will update the T bit flag to the value specified by bit [0] of register Rm. Accordingly, if that bit has a value of zero, this indicates that the instruction at the target address is an ARM instruction, whereas if it has a value of one, this indicates that the instruction at the target address is a Thumb instruction. In preferred embodiments, the register that contains the branch target address can be any of registers R0 to R14 of the register bank 130, with the register number being encoded in the instruction in H2 (most significant bit) and Rm (remaining three bits). Bits 0 to 2 of the Thumb BLX (2) instruction should be zero.

FIG. 3F illustrates the Thumb BX (Branch and Exchange) instruction, which is used to branch between Thumb code and ARM code. It will be seen from a comparison of FIGS. 3E and 3F that this instruction has a similar form to the Thumb BLX (2) instruction. However, for the BX instruction, bit 7 is set to zero, and accordingly the prediction logic 90 will recognise a Thumb BX instruction if bits 15 to 7 of the instruction have the value "010001110". As with the Thumb BLX (2) instruction, the prediction logic 90 will set the T bit to the value stored in bit [0] of Rm. Further, the register that contains the branch target address can be any of register R0 to R15, with the register number being encoded in the instruction in H2 (most significant bit) and Rm (remaining three bits). Bits 2 to 0 of the instruction should be zero.

As is apparent from the above description of an embodiment of the present invention, the prediction logic is used not only to predict whether execution of a prefetched instruction will cause a change in instruction flow (for example a branch), but also whether such a change in instruction flow will cause a change in instruction set. If a change in instruction set is detected, then the prediction logic 90 is arranged to change the value of a T bit flag that is then associated with each instruction passed from the prefetch unit to the processor core to enable the instruction to automatically be routed to the appropriate decoder. This provides a particularly efficient technique for switching between instruction sets in a data processing apparatus that supports execution of instructions from multiple instruction sets.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

What is claimed is:

1. A data processing apparatus, comprising:

a processor core for executing instructions from any of a plurality of instruction sets;

a prefetch unit for prefetching instructions from a memory prior to sending those instructions to the processor core for execution;

prediction logic for predicting which instructions should be prefetched by the prefetch unit, the prediction logic for reviewing a prefetched instruction to predict whether execution of that prefetched instruction will cause a change in instruction flow, and, if so, for indicating to the prefetch unit an address within said memory from which a next instruction should be retrieved;

the prediction logic further for predicting whether the prefetched instruction will additionally cause a change in instruction set, and, if so, for causing an instruction set identification signal to be generated for sending to the processor core to indicate the instruction set to which said next instruction belongs.

2. A data processing apparatus as claimed in claim 1, wherein the prediction logic is arranged to detect the presence of an instruction of a first type which when executed will cause a change in instruction set if execution also results in said change in instruction flow.

3. A data processing apparatus as claimed in claim 2, wherein execution of said instruction of the first type will unconditionally cause said change in instruction flow, and wherein the address within said memory from which said next instruction should be retrieved is specified within the instruction.

4. A data processing apparatus as claimed in claim 1, wherein the prediction logic is arranged to detect the presence of an instruction of a second type which when executed can cause said change in instruction flow, and where data identifying the instruction set following said change in instruction flow is specified by the instruction.

5. A data processing apparatus as claimed in claim 4, wherein said instruction of said second type specifies a register which contains said data identifying the instruction set following said change in instruction flow.

6. A data processing apparatus as claimed in claim 5, wherein said register also contains an indication of the address within said memory from which a next instruction should be retrieved assuming the change in instruction flow takes place.

7. A data processing apparatus as claimed in claim 4, wherein said change in the instruction flow occurs only if predetermined conditions are determined to exist at the time that the instruction of said second type is executed.

8. A data processing apparatus as claimed in claim 1, wherein said prediction logic is a branch prediction logic, and said change in instruction flow results from execution of a branch instruction.

9. A data processing apparatus as claimed in claim 1, wherein if the prediction logic predicts that execution of said prefetched instruction will cause said change in instruction flow, said prefetched instruction is not passed by the prefetch unit to the processor core for execution.

10. A data processing apparatus as claimed in claim 9, wherein if said change in instruction flow is dependent on predetermined conditions existing at the time that the prefetched instruction is executed, a condition signal is sent to the processor core for reference by the processor core when executing said next instruction, the processor core being arranged, if said predetermined conditions are determined by the processor core not to exist, to stop execution of said next instruction, and to issue a mispredict signal to the prefetch unit.

11. A data processing apparatus as claimed in claim 9, wherein said prediction logic is a branch prediction logic, and said prefetched instruction is a branch instruction, said branch instruction being of a type which specifies a subroutine which when completed will cause the instruction flow to return to the instruction sequentially following the branch instruction, the prediction logic being arranged to output a write signal to the processor core to cause the processor core to store an address identifier which can subsequently be used to retrieve said instruction sequentially following the branch instruction.

12. A data processing apparatus as claimed in claim 1, wherein said prediction logic is contained within said prefetch unit.

13. Prediction logic for a prefetch unit of a data processing apparatus, the data processing apparatus having a processor core for executing instructions from any of a plurality of instruction sets, and said prefetch unit being arranged to prefetch instructions from a memory prior to sending those instructions to the processor core for execution, said prediction logic being arranged to predict which instructions should be prefetched by the prefetch unit, and comprising:

review logic for reviewing a prefetched instruction to predict whether execution of that prefetched instruction will cause a change in instruction flow, and if so to indicate to the prefetch unit an address within said memory from which a next instruction should be retrieved; and instruction set review logic for predicting whether the prefetched instruction will additionally cause a change in instruction set, and if so to cause an instruction set identification signal to be generated for sending to the processor core to indicate the instruction set to which said next instruction belongs.

14. A method of predicting which instructions should be prefetched by a prefetch unit of a data processing apparatus, the data processing apparatus having a processor core for executing instructions from any of a plurality of instruction sets, and said prefetch unit being arranged to prefetch instructions from a memory prior to sending those instructions to the processor core for execution, the method comprising the steps of:

(a) reviewing a prefetched instruction to predict whether execution of that prefetched instruction will cause a change in instruction flow, and if so indicating to the prefetch unit an address within said memory from which a next instruction should be retrieved; and (b) predicting whether the prefetched instruction will additionally cause a change in instruction set, and if so causing an instruction set identification signal to be generated for sending to the processor core to indicate the instruction set to which said next instruction belongs.

* * * * *